June 23, 1964    D. KAHN    3,138,026
ALTERNATING CURRENT RADIATION BOLOMETER
Filed Oct. 22, 1962
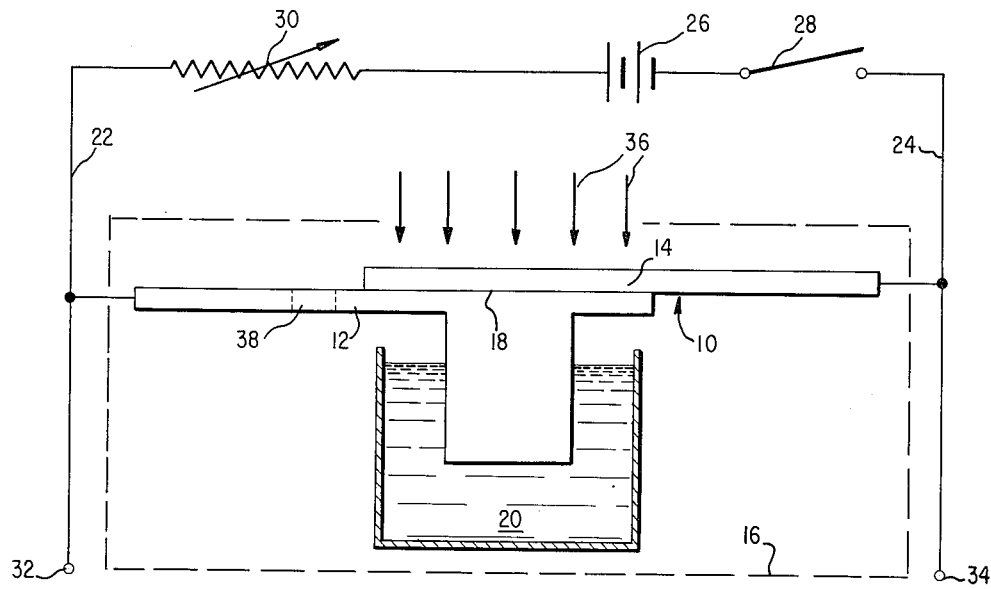
FIG.1
FIG.2
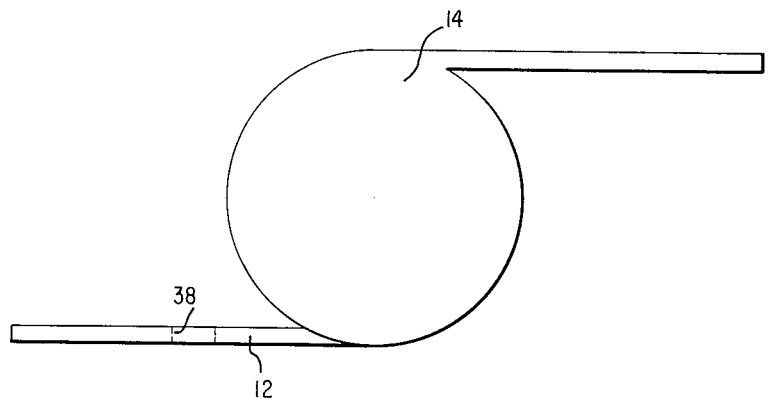
INVENTOR.
DAVID KAHN
BY
*Sughrue, Rothwell, Mion and Zinn*
ATTORNEYS

3,138,026
ALTERNATING CURRENT RADIATION BOLOMETER
David Kahn, Baltimore, Md., assignor to Martin Marietta Corporation, Baltimore, Md., a corporation of Maryland
Filed Oct. 22, 1962, Ser. No. 231,962
6 Claims. (Cl. 73—355)

This invention relates to a radiation detecting system of the bolometer type and more particularly to a superconductor oscillator system employing a bolometer in the form of a thermocouple in which the frequency of the alternating current is indicative of the intensity of the radiation being measured.

In the radiation measurement field, one type of conventional instrument makes use of a thermocouple as a means for detecting the amount of infrared energy impinging thereon. A thermocouple comprises a pair of joined, dissimilar materials, such as metals, whereby in effecting a temperature differential between the two contacts of the dissimilar materials, an electrical potential difference can be set up across the materials, or, in the alternative, by directing current through the joined, dissimilar materials, heat may be absorbed or emitted at the junction thereof proportional to current flow. This phenomena, as applied to thermocouples, is known as the Peltier effect. In one form, thermocouples are used to detect infrared energy by converting the heat effect produced on the impinged thermocouple to an electrical signal which is proportional to the amount of radiation impinging thereon. However, one of the difficulties in measuring radiated energy, especially extremely small amounts of radiated energy, is the fact that the output electrical signals are extremely minute. This condition coupled with the fact that such detectors usually have a rather high signal to noise ratio complicates the problem of accurately and reliably detecting radiated energy. In addition, the time response in radiation detectors of this type is often a limiting factor in design considerations.

In the field of cryogenic phenomena, superconductivity has been employed extensively in the design of electrical systems. Kamerlingh Onnes discovered in 1911 during an investigation of the low temperature resistivity of mercury, that its resistance underwent an abrupt transition from a finite value to substantially zero at 4.2° Kelvin. In the intervening years, similar effects have been found in 21 other metals and in many alloys. It was additionally discovered that for each superconductor material, in the absence of a magnetic field, there is a particular temperature called the critical temperature $T_c$ at which the transition of the material occurs from a normal state having finite resistance to the superconductive state having substantially zero resistance. Subjecting the superconductive material to a magnetic field results in a change in the critical temperature depending upon the magnitude of the magnetic field. The critical temperature is lowered as the intensity of the magnetic field around the material is increased from zero.

The present invention makes use of the fact that transition of a body from the superconductive to the normal state may be brought about by the simple expedient of raising the temperature of the body beyond its critical temperature, and conversely, the transition from the normal to the superconductive state may be brought about by lowering the temperature of the body to a point below its critical temperature. This characteristic may be applied to a bolometer in the form of a superconductor thermocouple.

It is, therefore, a primary object of this invention to provide an improved radiation detecting oscillator system which makes use of a superconductor thermocouple bolometer by the application of the temperature resistance characteristic of superconductors.

It is a further object of this invention to provide an improved radiation detection system of this type which provides an accurate and precise measurement of radiated energy.

It is a further object of this invention to provide an improved radiation detection system of this type which provides accurate and precise measurements regardless of ambient temperature changes.

In the drawing:

FIG. 1 is a schematic view, partially in section, of the improved radiation detection system of the present invention.

FIG. 2 is a top plan view of the superconductor thermocouple bolometer showing a preferred configuration for the radiation impinging area.

In general, the system of the present invention makes use of the Peltier effect occurring at a junction between two materials, of which one is a superconductor, to detect and measure radiation falling on the junction by modification of the frequency of an alternating signal produced by the junction. If an alternating current oscillation is superimposed upon a direct current passing through the thermocouple junction, the frequency of oscillation of the alternating current is dependent upon the rapidity of heat flowing through and being extracted from the junction. The incident radiation produces a steady supply of heat to the junction and changes the frequency of oscillation. The measurement of the frequency of the alternating current, therefore, corresponds to the intensity of the radiation impinging upon the bolometer thermocouple.

In one specific form, the thermocouple is thermally isolated with the non-superconductive leg and the junction maintained at a temperature just above the critical transition temperature of the superconductor material. Means are provided for passing a direct current through the thermocouple to effect alternate transition of the superconductive material from the superconductive to the normal state as a result of Peltier cooling at the junction of the thermocouple. This produces a superimposed alternating current flow through the thermocouple. The incident radiation produces a steady supply of heat to the junction and thus changes the frequency of oscillation which is a direct measurement of the intensity of radiation impinging thereon.

Referring to the drawing, the radiation detection system of the present invention consists essentially of a bolometer in the form of a thermocouple 10 consisting of a pair of joined elements 12 and 14 formed of dissimilar materials. The material 12 forming one leg of the thermocouple may be of some suitable metal conductor or a semiconductor while the material 14 forming the second leg of the thermocouple is formed of any material capable of becoming superconductive. The thermocouple is thermally isolated as indicated by dotted line 16. The leg 12 and effectively the junction 18 are maintained at a temperature determined by a suitable liquid helium bath 20 or the like, which is originally slightly above the superconducting transition temperature $T_c$ of the superconductive material 14. Leg 14 is not in direct contact with the temperature bath 20 but is subjected to the cooling effect of the low temperature liquid helium bath 20 by means of heat flow through the conductor or semiconductor material 12. The ends of the thermocouple are connected by means of leads 22 and 24 to a source of direct current, which is shown schematically in the form of a battery 26, through a switch 28. A variable resistance or rheostat 30 is connected in series with the source of current 26 and the thermocouple 10 such that the value of direct current flow through the thermocouple may be set at any desired level. A pair of output terminals 32 and 34 may be connected to a frequency measuring device to determine the frequency of the alternating current which is superimposed upon the direct current flowing through thermocouple 10 as a result of the operation of the system.

The direction of current flow through the junction 18 which results upon closure of switch 28 is such that when the current passes through the junction 18, heat is absorbed proportional to the current at the junction due to the conventional Peltier effect of two dissimilar materials. The heat absorbed per unit of current is equal to the difference of the Peltier coefficients of the two materials 12 and 14. The current is adjusted by the variable resistance or rheostat 30 so that the Peltier cooling is more rapid than the heat flow along the elements 12 and 14 to the now more cooled junction 18. Obviously, since both the materials 12 and 14 have finite resistance at this point, the current flow through the elements causes an $I^2R$ loss or joule heating effect which opposes the Peltier cooling effect at the thermocouple junction 18. Since the cooling effect is greater than the joule heating effect, the junction 18 will continue to drop in temperature until the material 14 at the junction becomes superconducting. At this point, the Peltier cooling per unit of current will increase or decrease depending upon whether the Peltier coefficient of the superconductive material 14 above the transition temperature is of the same sign or of opposite sign as that of the material 12. The current through the junction 18 will increase since that portion of the material 14 which is superconducting now has substantially zero resistance. At the same time, heat is being produced in the material 12 and the portion of the material 14 which is not superconducting due to the ordinary joule heating as a result of the $I^2R$ loss. Since the joule heating is proportional to the square of the current ($I^2R$), the resistance of the material 12 and the current level produced by rheostat 30 may be adjusted such that the increased joule heating occurring when a portion of the material 14 at the junction 18 becomes superconducting is larger than the Peltier cooling.

After a time dependent upon the properties of the materials 12 and 14 making up the thermocouple, their size and their degree of partial isolation from the surrounding temperature bath, the joule heating raises the temperature of the superconductive material 14 above the superconducting transition temperature $T_c$. At this point, the current will drop to its former value due to the increased resistance since the superconductive material has now reverted to its normal state, and the joule heating will decrease. The Peltier cooling effect is increased, and since it is greater than the joule heating effect, it will again reduce the temperature at the junction 18 until a portion of the superconductive material 14 reaches its transition temperature and becomes superconducting, and the oscillatory process begins another period. The basic oscillator circuit is set forth fully in co-pending application Serial No. 231,947 by the same inventor and assigned to the common assignee.

The frequency of the relaxation oscillator will, in the absence of radiation, theoretically remain at a constant value as long as there is no change in the D.C. component of the current flow through the thermocouple. The present invention makes use of the fact that radiation, such as infrared radiation, will supply additional heat to the junction and thus change the frequency of oscillation, which change can be observed and measured as an indication of the intensity of the radiation impinging upon the thermocouple. As indicated by the arrows 36 of FIG. 1, infrared radiation impinging upon the thermocouple 10 produces a steady supply of heat to the junction 18 and thereby affects the time required for the Peltier cooling effect to over ride the joule heating to produce superconductivity in a portion of the superconductive material 14 as well as effecting the time in which the joule heating experienced by the thermocouple after a portion of the material 14 becomes superconducting overcomes the Peltier cooling effect to cause transition of the superconductive material 14 back to its normal state.

If radiation is made to fall on the junction, it may be easily seen that the period of relaxation will be shortened and thus the detection of the radiation may be accomplished using conventional frequency measuring means. Note that it is not necessary to interrupt the steady illumination by radiation as indicated by arrows 36 at the junction to produce the alternating current signal. As indicated in FIG. 2, the particular configuration of the legs or elements 12 and 14 forming the thermocouple at the junction 18 are circular while the extreme outer ends of the elements are in the form of thin, rod-shaped, tangential extensions. The purpose of the specific configuration, which is best shown in FIG. 2, is that a broad junction formed in this manner acts to combine a rapid oscillation frequency together with favorable geometry for use as an infrared detector since it provides a maximum size target for the impinging radiation.

The relaxation oscillation may be enhanced by making material 12 non-homogeneous. If a section of higher resistance material is inserted a short distance from the junction 18, as schematically shown by dotted lines 38 in FIGS. 1 and 2, then the joule heating may be considered to be concentrated in this section. This heat will then reach the junction by thermoconductivity after a period of time dependent upon the length of the intervening material. This mechanism will cause a time lag between the production of the joule heat and its appearance at the junction. Therefore, the placement of the high resistance material 38 at varying points throughout the material 12 and thus spaced differently from the junction 18 will cause a varying time lag and thus may be used to control the initial period of oscillation.

It is interesting to note that the current instability is aided also by the fact that as the material 14 at the junction becomes superconducting as a result of the Peltier cooling, the Peltier cooling drops at this junction since, as a consequence of the electromagnetic behavior of the ideal superconductor, the Peltier coefficient of the material in the superconducting state will be zero. This means that the heat produced or extracted at a junction between a normal conductor, such as metal, and a superconductor will change if the temperature of the junction is varied throughout the transition temperature $T_c$. Thus, there will be heat extracted at the point in the material 14 between that portion which is now superconducting and that portion which is still above the transition temperature. This heat extraction will tend to move the boundary away from the junction and toward the free end of the thermocouple leg, thus increasing the fraction of material 14 that is superconducting, and hence, increase the current since the over-all resistance is decreasing as the portion of material 14 which becomes superconductive increases.

In the operation of the superconductor bolometer of the present invention, there is at all times both resistance heating and Peltier cooling. For instance, initially, when the material 14 is at a temperature above the transition temperature $T_c$ and is in the normal state, the total resistance offered by legs 12 and 14 of the thermocouple is such that heating due to the $I^2R$ loss as a result of the current flow, is less than the cooling caused by the Peltier effect at junction 18. Thus, in this portion of the period, the cooling outweighs the heating eventually causing a portion of the material 14 to become superconducting. Necessarily, when a portion of the material 14 adjacent the junction 18 becomes superconducting, the Peltier effect will change and produce less cooling, while the current will increase due to the resistance decrease, the $I^2R$ loss will increase and the resulting heating effect will be greater than the Peltier cooling effect. The joule heating will then cause the junction to warm up and a portion of material 14 adjacent thereto to cease superconducting. The current will then decrease and the Peltier cooling will again cool the junction, repeating the cycle. The frequency or speed of oscillation is partially dependent upon the value of the current passing through the thermocouple 1 which may be controlled by rheostat 18 and also on the inherent thermal response of the oscillator. However, in the operation of the oscillator in a radiation detection system, these factors are held constant and the frequency of oscillation is increased in proportion to the amount of radiation impinging upon the thermocouple bolometer.

While in the preferred embodiment, the leg 12 of the thermocouple is formed of a conventional metal conductor while leg 14 is formed of a metal conductor having superconducting properties, the leg 12 or both legs 12 and 14 may be formed of semiconductors. In the case of two semiconductors, there may not be as abrupt a change in the Peltier coefficients of the two materials. However, this disadvantage may be offset by the fact that the Peltier coefficients of semiconductors are many orders of magnitude larger than they are for metals and alloys and the resistivities and hence the joule heating may be varied tremendously by proper doping and alloying.

It is readily apparent that the thermocouple 10 must be at least partially thermally isolated since ambient temperature change will naturally have an effect upon the output frequency of the superimposed alternating current at output terminals 32 and 34. One method of eliminating the effect of ambient temperature changes would be to provide a pair of similar units to that shown in FIG. 1 in which only one of the units is illuminated by the radiant energy to be measured. In this case, a measure of the difference in frequency between the two units would eliminate any variation in the frequency of oscillation that would occur due to the ambient temperature effects.

In conventional radiation measurement systems employing a thermocouple upon which the radiation impinges and in which the resultant electrical current is indicative of the intensity of radiation, this approach to radiation measurement is found to be ineffectual in the measurement of extremely small amounts of radiation due to the fact that conventional current measuring means are incapable of measuring the extremely minute electrical signals and the even smaller changes therein as a result of changes in energy impingement. The present invention advantageously provides a system in which the strength of the current signal is unimportant and in which the frequency is the determining factor. In the system of the present invention, extremely small changes in radiation intensity may result in comparatively large frequency changes by appropriate control of the parameters of the present system including the direct current flow through the thermocouple, the type of materials forming the superconductive and non-superconductive legs of the thermocouple and the position of the large resistance portion 38 of the non-superconductive leg 12 with respect to the junction 18.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A radiation detection system comprising: a bolometer in the form of a thermally isolated thermocouple including joined, dissimilar materials, one of said materials having superconductive properties, said thermocouple positioned to receive said radiation, means for maintaining said other material just above the critical transition temperature of said superconductive material, means for passing a direct current through said thermocouple to effect alternate transition of said superconductor material from the superconductive to the normal state as a result of Peltier cooling to produce a superimposed alternating current flow through said thermocouple, and means to measure the frequency of said alternating current as a measurement of the radiation impinging upon said bolometer.

2. A radiation detection system comprising: a bolometer in the form of a thermocouple including joined first and second dissimilar materials, means for thermally isolating said thermocouple, said first material having superconducting properties and said second material being a non-superconductor, means for maintaining said second material at a temperature just above the critical transition temperature of said first material, means for passing a direct current through said thermocouple to effect Peltier cooling at the junction thereof with resultant alternate transition of said first material from a superconductive to the normal state to effect a superimposed alternating current flow through said thermocouple, means for positioning said thermocouple to receive said radiation, means for varying said direct current flow through said thermocouple to change the base frequency of said superimposed alternating current, and means to measure the frequency of said alternating current as a measurement of the radiation intensity impinging upon said bolometer.

3. The system as defined in claim 2 wherein said second material comprises a semiconductor.

4. A radiation detection system comprising: a bolometer in the form of a thermocouple including joined first and second legs of dissimilar material, said thermocouple positioned to receive said radiation, said first leg comprising a material having superconducting properties, said second leg comprising a non-homogeneous material not having superconducting properties, means for maintaining said second leg at a temperature just above the critical transition temperature of said first leg, means for thermally isolating said thermocouple, means for passing direct current through said thermocouple to effect Peltier cooling at the junction thereof whereby a portion of said first leg adjacent said junction alternately changes from a superconductive to a normal state to produce a superimposed alternating current flow through said thermocouple, and means to measure the frequency of said alternating current as a measurement of the radiation intensity impinging upon said bolometer.

5. A radiation detection system comprising: a bolometer in the form of a thermocouple including a pair of joined legs formed of dissimilar materials, said thermocouple being positioned to receive said radiation, one of said legs being formed of a material having superconducting properties and said other leg being formed of non-homogeneous material having non-superconducting properties, said non-homogeneous leg including a portion of relatively high resistance adjacent the junction between said first and second leg, means for thermally isolating said thermocouple, means for maintaining said second leg at a temperature just above the critical transition temperature of said superconducting material, and means for passing direct current through said thermocouple to effect Peltier cooling at the junction thereof, whereby a portion of the superconductive material adjacent said junction changes alternately from the superconductive to the normal state to produce a superimposed alternating current flow through said thermocouple with said high resistance portion of said non-homogeneous leg acting to increase the frequency of oscillation and to decrease the time lag between the production of joule heat at the high resistance portion and its appearance at said junction, and means to measure the frequency of said alternating current as a measurement of the radiation intensity impinging upon said thermocouple.

6. A radiation detection system comprising: a first bolometer and a second bolometer in the form of thermally isolated thermocouples, each thermocouple including joined, dissimilar materials, one of said materials having superconductive properties, said first bolometer positioned to receive said radiation, means for maintaining said other material of said first and second bolometers at a temperature just above the critical transition temperature of said superconductor material, means for passing a direct current through said thermocouples to effect alternate transition of said superconductor material from a superconductive to the normal state as a result of Peltier cooling to produce a superimposed alternating current flow through said thermocouples, means to measure the frequency of said alternating current in each of said thermocouples, and means to compare said frequency measurements of said first and second bolometers whereby the difference in frequency is indicative of the radiation intensity impinging upon said first bolometer.

References Cited in the file of this patent

UNITED STATES PATENTS

| | | |
|---|---|---|
| 2,924,976 | Babiskin et al. | Feb. 16, 1960 |
| 3,022,468 | Rosenberger et al. | Feb. 20, 1962 |